(12) United States Patent
Yang

(10) Patent No.: US 9,503,883 B2
(45) Date of Patent: Nov. 22, 2016

(54) METHOD AND SYSTEM FOR AUTOMATICALLY SWITCHING SUBSCRIBER MODE THROUGH IDENTIFYING IMSI

(71) Applicant: HUIZHOU TCL MOBILE COMMUNICATION CO., LTD., Huizhou (CN)

(72) Inventor: Yan Yang, Huizhou (CN)

(73) Assignee: HUIZHOU TCL MOBILE COMMUNICATION CO., LTD., Huizhou (CN)

(*) Notice: Subject to any disclaimer, the term of this patent is extended or adjusted under 35 U.S.C. 154(b) by 0 days.

(21) Appl. No.: 14/422,611

(22) PCT Filed: Apr. 24, 2014

(86) PCT No.: PCT/CN2014/076082
§ 371 (c)(1),
(2) Date: Sep. 9, 2015

(87) PCT Pub. No.: WO2015/043172
PCT Pub. Date: Apr. 2, 2015

(65) Prior Publication Data
US 2016/0044490 A1 Feb. 11, 2016

(30) Foreign Application Priority Data
Sep. 27, 2013 (CN) .......................... 2013 1 0448160

(51) Int. Cl.
H04M 1/66 (2006.01)
H04W 8/18 (2009.01)
H04W 12/06 (2009.01)

(52) U.S. Cl.
CPC ............. H04W 8/183 (2013.01); H04W 12/06 (2013.01)

(58) Field of Classification Search
CPC ... H04W 12/02; H04W 12/06; H04W 12/08; H04W 12/12; H04W 88/02; H04W 88/06; H04W 48/18

USPC .............................. 455/410, 411, 558, 552.1
See application file for complete search history.

(56) References Cited

U.S. PATENT DOCUMENTS 6,311,055 B1* 10/2001 Boltz ....................... H04M 1/66
                                                                  379/196
8,311,532 B2* 11/2012 Waller .................... H04L 12/14
                                                                  455/406
8,463,258 B2*  6/2013 Parsons .................. H04W 8/30
                                                                  455/411
9,184,801 B2* 11/2015 Li ......................... H04B 5/0031

(Continued)

FOREIGN PATENT DOCUMENTS

CN          1852523 A          10/2006
CN          1887008 A          12/2006

(Continued)

OTHER PUBLICATIONS

Chinese Office Action in CN Application No. 201310448160.8 dated Mar. 1, 2016.

Primary Examiner — Temica M Beamer
(74) Attorney, Agent, or Firm — Shimokaji IP

(57) ABSTRACT

A method for automatically switching subscriber mode through identifying IMSI includes, when a cell phone is turned on, determining if a first IMSI is consistent with a pre-stored second IMSI. If the first IMSI is determined to be consistent with the second IMSI, the cell phone enters a subscriber mode corresponding to the second IMSI. If the first IMSI is determined to not be consistent with the second IMSI, the first IMSI is matched with a third IMSI of an IMSI list pre-stored in the cell phone; when the first IMSI is determined to be consistent with the third IMSI, the cell phone enters a subscriber mode corresponding to the third IMSI. Thereby, the cell phone quickly and efficiently completes identifying an IMSI and automatically switches subscriber mode.

20 Claims, 2 Drawing Sheets

(56) References Cited

U.S. PATENT DOCUMENTS

| | | | |
|---|---|---|---|
| 9,253,630 B2* | 2/2016 | Tagg | H04W 4/003 |
| 2010/0014662 A1* | 1/2010 | Jutila | H04L 9/083 |
| | | | 380/44 |
| 2013/0017862 A1* | 1/2013 | Lee | H04W 60/005 |
| | | | 455/558 |
| 2015/0065197 A1* | 3/2015 | Wu | H04M 1/72519 |
| | | | 455/558 |

FOREIGN PATENT DOCUMENTS

| | | |
|---|---|---|
| CN | 101098536 A | 1/2008 |
| CN | 101098563 A | 1/2008 |
| CN | 101287193 A | 10/2008 |
| CN | 102098661 A | 6/2011 |
| CN | 103476149 A | 12/2013 |
| WO | 2006065633 A3 | 10/2006 |

\* cited by examiner

METHOD AND SYSTEM FOR AUTOMATICALLY SWITCHING SUBSCRIBER MODE THROUGH IDENTIFYING IMSI

TECHNICAL FIELD

The present disclosure generally relates to the field of mobile communication terminal technologies. In particular, the present disclosure relates to a method and system for automatically switching a subscriber mode through identifying an IMSI (International Mobile Subscriber Identification Number).

BACKGROUND

Currently, a cell phone enters the same mode, irrespective of which type SIM (Subscriber Identity Module) card (e.g. a GSM (Global System for Mobile Communications) 900/1800 SIM card, or any other SIM card that meets network standard requirements) is inserted in the cell phone, when the cell phone is turned on. However, different people have different selections and requirements for the cell phone mode. In some cases, different SIM cards are inserted into the same cell phone, for use by different subscribers, even when the cell phone only includes one default subscriber mode. As a result, some subscribers cannot use a mode that they like or are used to. Alternatively, for a dual-card dual-standby cell phone with two SIM cards inserted, the subscriber sometimes has different needs for the two cards, with one SIM card focusing on entertainment functions and the other SIM card, that shuts down the entertainment functions, and only has communication functions so as to prevent children, for example, from spending too much time playing with the cell phone. Currently, however, dual-card dual-standby cell phones can only enter one mode. As a result, subscriber needs cannot be satisfied with currently available cell phones.

Therefore, the prior art needs to be improved and developed.

SUMMARY

In light of the above, the objects of the present invention are to provide a method and system for automatically switching a subscriber mode through identifying an IMSI, such that a subscriber mode is automatically switched according to different subscribers.

The present invention employs the following technical solution:

A method for automatically switching a subscriber mode through identifying an IMSI includes pre-setting an IMSI list in a cell phone, receiving a first IMSI entered by a subscriber, and storing the first IMSI into the IMSI list, receiving a subscriber mode configuration set by the subscriber for the first IMSI, storing the subscriber mode configuration in the IMSI list and correlating to the first IMSI, and the cell phone pre-stores a second IMSI when the cell phone is shut down, and the cell phone automatically records the second IMSI of a second SIM card and information of a subscriber mode associated with the second SIM card, and stores the second IMSI and the information of the its subscriber mode associated with the second SIM card in the cell phone memory.

In another embodiment, a method for automatically switching a subscriber mode through identifying an IMSI includes when a cell phone is turned on, reading a first IMSI of a first SIM card currently inserted into the cell phone; determining if the first IMSI is consistent with a second IMSI pre-stored in the cell phone; if the first IMSI is determined to be consistent with the second IMSI, the cell phone is turned on and enters a subscriber mode corresponding to the second IMSI; if the first IMSI is determined to not be consistent with the second IMSI, the first IMSI is compared with a third IMSI in an IMSI list pre-stored in the cell phone; and when the first IMSI is determined to be consistent with the third IMSI, the cell phone enters a subscriber mode corresponding to the third IMSI.

In a further embodiment, a method for automatically switching a subscriber mode through identifying an IMSI includes, when a cell phone pre-stores a second IMSI, and when the cell phone is shut down, the cell phone automatically records the second IMSI of a second SIM card and second IMSI information corresponding to the subscriber mode, and stores the second IMSI and the second IMSI information in a cell phone memory.

In yet another embodiment, a method for automatically switching a subscriber mode through identifying an IMSI includes, when a cell phone pre-stores an IMSI list, setting up the IMSI list in the cell phone, receiving an IMSI entered by a subscriber and storing the IMSI, entered by the subscriber, into the IMSI list, receiving a subscriber mode configuration set by the subscriber for the IMSI entered by the subscriber, storing the subscriber mode configuration, set by the subscriber, in the IMSI list and correlating the subscriber mode configuration, set by the subscriber, to the IMSI entered by the subscriber.

In yet a further embodiment, a method for automatically switching a subscriber mode through identifying an IMSI includes setting up a mode change menu in a cell phone for performing subscriber-defined setup on an IMSI list, and setting up login authority for a mode change menu; receiving a control code entered by a subscriber and performing verification of the control code; and if the control code is verified, entering a settings interface of the mode change menu.

In another embodiment, a method for automatically switching a subscriber mode through identifying an IMSI includes, when a first IMSI is determined to not be consistent with any IMSI in an IMSI list pre-stored in a cell phone, the cell phone enters a control code input interface of a mode change menu, receiving a control code inputted by a subscriber and performing verification of the control code; and if the control code is verified, entering the settings interface of the mode change menu to add the first IMSI to the IMSI list, and receiving and storing the subscriber mode entered by the subscriber corresponding to the first IMSI.

In a further embodiment, a method for automatically switching a subscriber mode through identifying an IMSI includes a cell phone that enters a subscriber mode entered by the subscriber, corresponding to a first IMSI, when the first IMSI is added to an IMSI list, and a subscriber mode set by a subscriber, corresponding to the first IMSI, is received and stored.

In yet another embodiment, a method for automatically switching a subscriber mode through identifying an IMSI includes a cell phone that enters a regular mode, that only has a function to make emergency calls, when a first IMSI is determined to not be consistent with any IMSI in an IMSI list pre-stored in the cell phone, and when a received control code, that is entered by the subscriber, fails verification.

In yet a further embodiment, a method for automatically switching a subscriber mode through identifying an IMSI includes control code verification information that is stored in a mode change menu and data information of the mode change menu is stored in a cell phone memory.

In another embodiment, a system for automatically switching a subscriber mode through identifying an IMSI includes a first IMSI reading module for reading a first IMSI of a first SIM card currently inserted into the cell phone; a second IMSI matching determination module for determining if the first IMSI is consistent with a second IMSI pre-stored in the cell phone, and carrying out predetermined operations according to the determination result; and an IMSI list matching determination module for matching the first IMSI with a third IMSI in an IMSI list pre-stored in the cell phone, and when the first IMSI is determined to be consistent with the third IMSI, the cell phone enters a subscriber mode corresponding to the third IMSI.

In a further embodiment, a non-transitory storage medium, which stores processor executable commands therein that, when executed by a processor, cause the processor to: when the cell phone is turned on, read a first IMSI of a first SIM card currently inserted into the cell phone; determine if the first IMSI is consistent with a second IMSI pre-stored in the cell phone; if the first IMSI is determined to be consistent with the second IMSI, the cell phone is turned on and enters a subscriber mode corresponding to the second IMSI; if the first IMSI is determined to not be consistent with the second IMSI, the first IMSI is compared with a third IMSI in an IMSI list pre-stored in the cell phone; and when the first IMSI is determined to be consistent with the third IMSI, the cell phone enters a subscriber mode corresponding to the third IMSI.

A method and system for automatically switching a subscriber mode through an identifying IMSI are provided. By setting an IMSI of a SIM card to correspond to a subscriber mode, and by setting two determination processes on a newly inserted SIM card, the method and system achieve a cell phone that can automatically enter different subscriber modes with no need to manually select a subscriber mode when a subscriber inserts a different SIM card. Thereby, the two determination processes ensure quick and efficient completion of identifying an IMSI and automatically switching a subscriber mode, which improves an experience of an associated cell phone.

DETAILED DESCRIPTION

A method and system for automatically switching a subscriber mode through identifying an IMSI may be provided. To make the objects, technical solutions, and advantages clear, the methods and systems are described with reference to the accompanying figures and exemplary embodiments. It should be understood that the exemplary embodiments are for illustrative purposes. The exemplary embodiments are not intended to limit the scope of the present invention in any way.

A cell phone may enter a same mode irrespective of what type SIM card (e.g. GSM 900/1800, or any other SIM card that meets network standard requirements) is inserted in the cell phone, and when the cell phone is turned on. An IMSI, i.e. International Mobile Subscriber Identification Number, may be an identifier to differentiate mobile subscribers, may be stored in SIM cards, and may be used to differentiate valid information of mobile subscribers. Moreover, an IMSI may be unique, i.e. an IMSI may be bundled with a cell phone number, which may be defined in a server HLR (Home Location Register). A server HLR may be set and maintained by a service provider (e.g. China Mobile) that has a contract for a cell phone having a SIM card. A SIM card may correspond to a given IMSI code, and may be unique. A mobile terminal device, having multiple mobile subscriber modes, may enter different subscriber modes through identifying different IMSIs by the terminal, thereby, may allow use of one cell phone by multiple subscribers.

Figure 1:
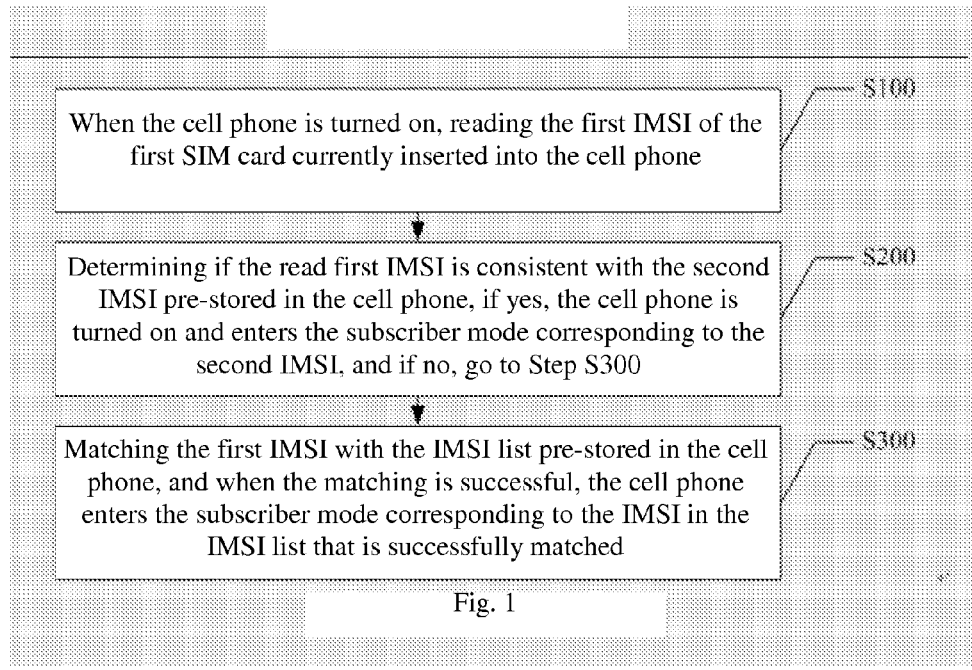
FIG. 1 depicts a flow chart of an exemplary method for automatically switching a subscriber mode through identifying an IMSI according to an embodiment of the present invention.

Turning to FIG. 1, a method for automatically switching a subscriber mode through identifying an IMSI may include, when a cell phone is turned on, reading a first IMSI of a first SIM card currently inserted into the cell phone (block S100). Each time the cell phone is turned on with a SIM card inserted, the terminal may obtain an EFimsi file that may store an IMSI in the SIM card through a reading action to obtain the first IMSI of the inserted SIM card (block S100). The method may also include determining if the first IMSI is consistent with a second IMSI pre-stored in the cell phone (block S200). If the first IMSI is determined to be consistent with the second IMSI, the cell phone may be turned on and may enter a subscriber mode corresponding to the second IMSI (block S200). If the first IMSI is determined to not be consistent with the second IMSI (block S200), the first IMSI may be compared with an IMSI list pre-stored in the cell phone, and when the first IMSI is determined to be consistent with a third IMSI in the pre-stored list, the cell phone may enter a subscriber mode corresponding to the third IMSI (block S300). Pre-storing the second IMSI may include, when the cell phone is shut down, the cell phone may automatically record the second IMSI of a second SIM card, and information of a subscriber mode that corresponds to the second IMSI, and may store the second IMSI and information of its corresponding subscriber mode in a cell phone memory. There may be a correlation between the second IMSI and its corresponding subscriber mode, and the IMSI of a previous shutdown may be stored. For multiple changes of SIM cards, an IMSI recorded after a last change of the SIM card may be stored. If a terminal is a dual SIM card terminal, two IMSIs may be stored in the memory upon shutdown of the terminal, and the terminal may compare the IMSIs one by one. Situations before and after insertion of a same SIM card into a subscriber's cell phone can be quickly determined, with no need for a subsequent matching process, which may realize quick start of the cell phone's subscriber mode and may facilitate subscriber operations.

The method for automatically switching a subscriber mode through identifying an IMSI may further include comparing the first IMSI with the IMSI list pre-stored in the cell phone, and when the first IMSI is determined to be consistent with an IMSI in the pre-stored list, the cell phone may enter a subscriber mode corresponding to the IMSI in the IMSI pre-stored list that is determined to be consistent with the first IMSI.

Pre-storing an IMSI list in a cell phone may include setting up an IMSI list in the cell phone, receiving an IMSI entered by a subscriber, and storing the IMSI, entered by the subscriber, into the IMSI list, receiving a subscriber mode configuration set by the subscriber for the IMSI entered by the subscriber, storing the subscriber mode, entered by the subscriber, in the IMSI list and correlating to the IMSI entered by the subscriber. Furthermore, setting up a mode change menu in the cell phone, for performing subscriber-defined setup on the IMSI list, may include setting up login authority for the mode change menu, receiving a control code entered by a subscriber, and performing verification of the control code. If the control code is verified, a settings interface of the mode change menu may be entered. In other words, a cell phone subscriber may type in an IMSI of a SIM card recognized by the subscriber. For example, a subscriber may enter an IMSI of his family member's SIM card into the mode change menu, and may store the IMSI in the IMSI list. Thereby, when the family member inserts his own SIM card in the subscriber's cell phone, the SIM card can pass the verification by the cell phone, and the family member may normally use the cell phone.

An exemplary IMSI list is shown in Table 1, in which correspondence between each IMSI and different subscriber modes may be set up. For example, IMSI 1, in Table 1, may correspond with, and may be correlated to a subscriber mode of basic functions+communication functions. An associated subscriber may, for example, make audio calls, video calls, send text messages, and send multimedia messages under this mode. When the cell phone is used by a young person, on the other hand, a mode corresponding to IMSI 3 of the young person's SIM card may include basic functions+entertainment functions, i.e. the subscriber may play all kinds of games, open up a player to listen to music, and may refresh Weibo online, etc. When a student, for example, is using a cell phone, parents may set up a mode, that corresponds to IMSI 2 of the student's SIM card, to be basic functions+study functions. Under this mode, the student may use dictionaries, e-books or other study applications that the subscriber has installed manually, but may not be able to open up applications with entertainment functions, such as Weibo and games, for example.

TABLE 1

Correspondence between IMSI in the IMSI list and subscriber modes

| IMSI | Subscriber mode |
| --- | --- |
| IMSI 1 | basic functions + communication functions (making audio calls, video calls, sending text messages, and sending multimedia message) |
| IMSI 2 | basic functions + study functions (e.g. dictionaries, e-books or other study applications that the subscriber has installed manually) |
| IMSI 3 | basic functions + entertainment functions (various developmental games, digital games, etc.) |
| IMSI 4 | all functions |
| IMSI codes defined by subscribers | other modes |
| other IMSI codes that are not self-defined | regular modes (limited functions) |

When a first IMSI is determined to be consistent with an IMSI list pre-stored in the cell phone, the cell phone may enter a control code input interface of a mode change menu, may receive a control code entered by a subscriber, and may perform verification of the control code. If the control code is verified, the cell phone may enter a settings interface of a mode change menu to add the first IMSI to the IMSI list, and may receive and store a subscriber mode set by the subscriber corresponding to the first IMSI.

There may be two pathways for a cell phone to receive a new IMSI. In a first pathway, as described above, a cell phone subscriber may enter a mode change menu to input and save an IMSI to a new SIM card, so as to ensure that the SIM card can pass verification after being inserted into the cell phone. In a second pathway, when a new SIM card is inserted into a cell phone, and after an IMSI, entered by a subscriber, is determined not to match a pre-stored IMSI in an IMSI list, the cell phone may automatically switch to a login interface of a mode change menu. If the subscriber inputs a correct control code, and verification of the control code is successful, the cell phone may determine that a new IMSI is permitted for use by the cell phone subscriber. Furthermore, the cell phone may automatically add the new IMSI to the IMSI list, and may enter a subscriber mode editing mode, which may allow the subscriber to set up a subscriber mode that the new IMSI is to correspond and correlate to. When the subscriber completes the setup, the cell phone may receive the setup information, and may store setup information in the IMSI list.

The cell phone may enter a set subscriber mode corresponding to a first IMSI when the first IMSI is added to the IMSI list, and the subscriber mode set by the subscriber, corresponding to the first IMSI, is received and stored. When a new IMSI is saved, and a corresponding subscriber mode is completed, the cell phone may automatically enter the subscriber mode corresponding to the new IMSI, which may be convenient for the subscriber, and there is no need for a manual switch after exiting the mode change menu.

The cell phone may enter a regular mode, that only has a function to make emergency calls, when the first IMSI is determined not to match the IMSI list pre-stored in the cell phone, and the received control code, that is entered by the subscriber, fails verification. In a circumstance that both verifications fail, the subscriber may not be the cell phone subscriber himself. To protect the cell phone owner's privacy, and to prevent the cell phone information from being stolen, the cell phone may automatically switch to the regular mode in which the cell phone may only have the function to make emergency calls. Accordingly, the user can only use the cell phone to make calls, but cannot look up information stored on the cell phone.

The control code verification information may be stored in a mode change menu, and data information, of the mode change menu, may be stored in a cell phone memory. The data information of the mode change menu may be stored in a storage space of the cell phone memory along with a second IMSI and corresponding subscriber mode information.

Figure 2:
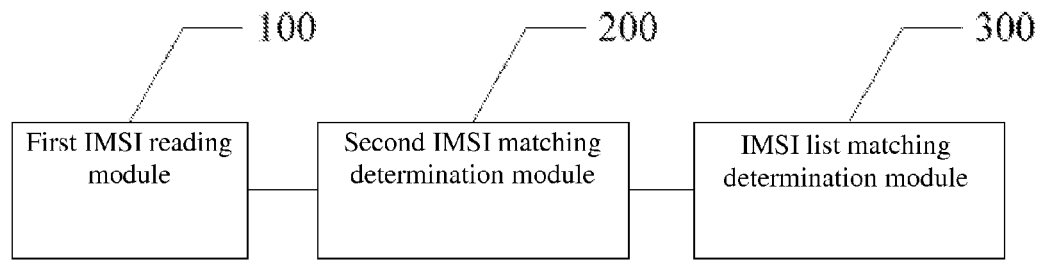
FIG. 2 depicts a block diagram of an exemplary system for automatically switching a subscriber mode through identifying an IMSI according to an embodiment of the present invention.

With reference to FIG. 2, a system for automatically switching a subscriber mode through identifying an IMSI, that may use the above method for automatically switching a subscriber mode through identifying an IMSI, may include a first IMSI reading module 100 for reading a first IMSI of a first SIM card currently inserted into a cell phone. The system may also include a second IMSI matching determination module 200 for determining if the first IMSI is consistent with a second IMSI pre-stored in the cell phone, and for carrying out predetermined operations according to the determination result. The system may further include an IMSI list matching determination module 300 for matching the first IMSI with the IMSI list pre-stored in the cell phone, and when the matching is successful, the cell phone may enter a subscriber mode corresponding to the IMSI in the IMSI list that is successfully matched.

Figure 3:
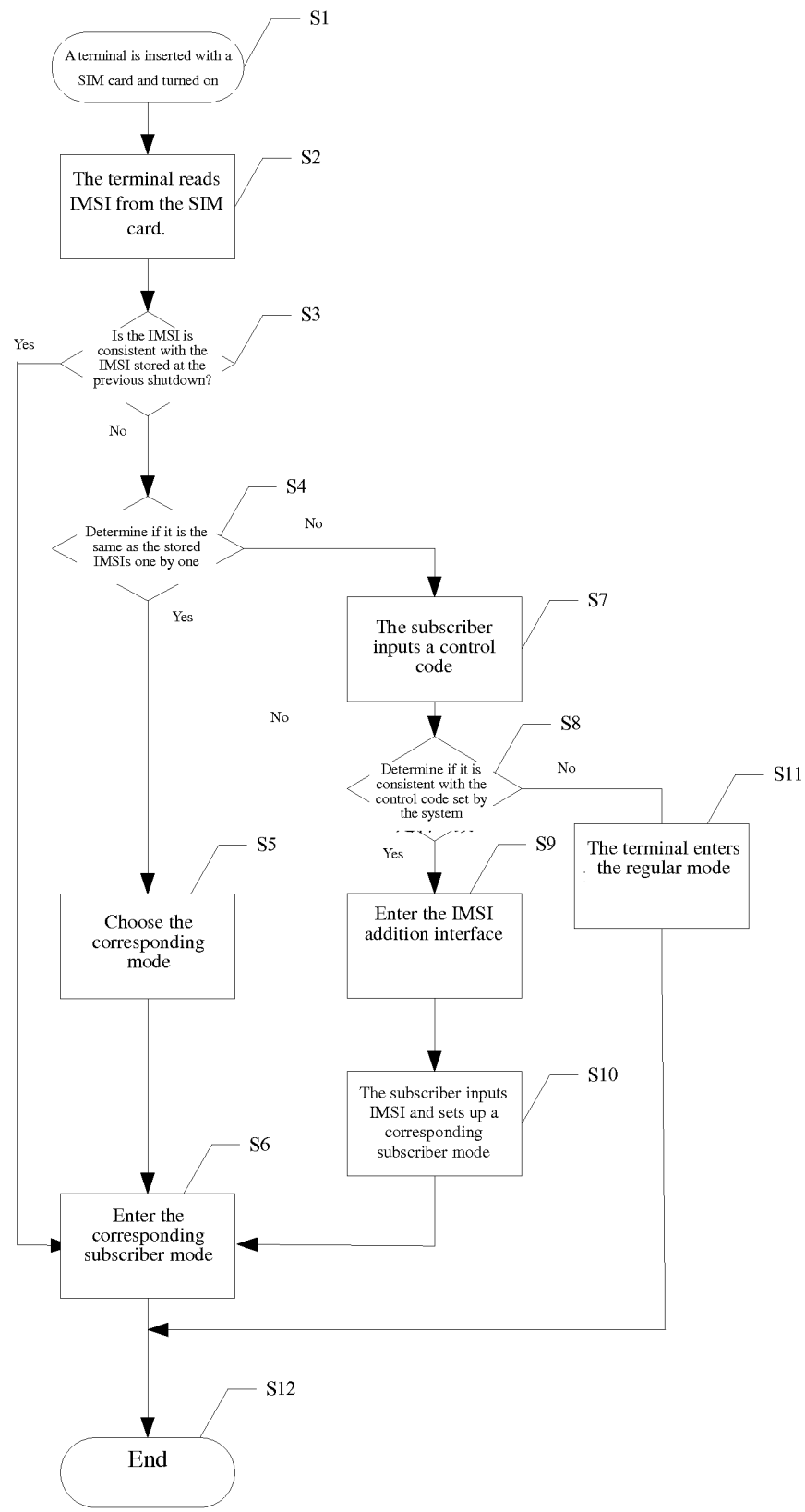
FIG. 3 depicts a flow chart of an exemplary method for automatically switching a subscriber mode through identifying an IMSI according to a preferred embodiment of the present invention.

Turning to FIG. 3, a flow chart of a method for automatically switching a subscriber mode through identifying an IMSI may include a SIM card inserted into a terminal (block S1). The cell phone may start initialization. The terminal may read an IMSI from an SIM card (block S2). The cell phone terminal may read, from the SIM card, an EFimsi filed stored therein, and may obtain an IMSI. If the IMSI is consistent with an IMSI stored at a previous shutdown, the cell phone terminal may call the IMSI stored at the previous shutdown, i.e. the IMSI in the SIM card of the cell phone at the previous shutdown, and may compare the IMSI stored at the previous shutdown with the obtained IMSI (block S3). If the obtained IMSI is consistent with the IMSI stored at the previous shutdown, the cell phone may enter a corresponding subscriber mode (block S6). The cell phone may enter the same subscriber mode as the previous shutdown. When the cell phone stores the IMSI at the previous shutdown, the cell phone may also record a correlated subscriber mode. When verifying if a IMSI of the current SIM card is consistent with the previous IMSI, the cell phone may directly enter a subscriber mode stored at the previous shutdown. The method may end (block S12).

If the IMSI in the SIM card of the cell phone at the previous shutdown is determined to not be consistent with the obtained IMSI (block S3) the cell phone may determine if the obtained IMSI is the same as stored IMSIs one by one (block S4). The cell phone may enter a second matching to match the obtained IMSI with IMSIs in the IMSI list pre-stored in the cell phone. If the matching is successful, the cell phone may choose the corresponding mode (block S5). Successful matching with an IMSI in the IMSI list may indicated that the obtained IMSI is from a SIM card used by the cell phone before, or confirmed by the cell phone subscriber in advance. Therefore, the cell phone may directly enter a mode change menu, and the subscriber may perform subscriber-defined setup to set up a subscriber mode for an obtained IMSI. Since the obtained IMSI has existed in the IMSI list, the subscriber may also choose a subscriber mode, that the obtained IMSI corresponds to, in default. When the subscriber confirms the corresponding mode, the cell phone may enter the corresponding subscriber mode (block S6), and may subsequently end the method (block S12).

If the obtained IMSI and an IMSIs in the IMSI list pre-stored in the cell phone is determined to not be consistent, the subscriber may input a control code (block S7), and may determine if the entered control code is consistent with a control code set by the system (block S8). In the circumstance that matching is not successful in both instances, the cell phone may determine that the SIM card is a new card to be used by the terminal subscriber, or the SIM card is a new card used by another subscriber, and that the SIM card has never been used on the terminal. In such a circumstance, the terminal may provide a subscriber authentication input interface to a subscriber control code input interface for determining if the subscriber is the terminal subscriber himself. When the control code entered by the subscriber is consistent with the control code set by the terminal (preferably this control code may be obtained through a legal route, e.g. when the device is purchased), the cell phone may enter an IMSI addition interface (block S9). For example, the terminal may enter a mode change menu. Subsequently, the subscriber may input an IMSI, and may set up a corresponding subscriber mode (block S10). On a subscriber-defined IMSI interface, the subscriber may add an IMSI code of a current SIM card, and may set up a corresponding mode. When the process is completed, the terminal may directly enter a mode stored by the subscriber (block S6). When the control code entered by the subscriber is not consistent with the control code set by the terminal, the terminal may enter a regular mode (block S11). Under the regular mode, the cell phone may have limited functions, and a subscriber of a newly inserted SIM card can only make emergency calls, and subsequently the method ends (block S12).

The system for automatically switching a subscriber mode through identifying an IMSI may be embodied on a terminal, for example, a computer, a tablet, a cell phone, etc. Any method for automatically switching a subscriber mode through identifying an IMSI may be implemented by the system for automatically switching a subscriber mode through identifying an IMSI.

It should be noted that, with respect to the method for automatically switching a subscriber mode through identifying an IMSI, those skilled in the art may understand that all or a part of the method may be completed by a computer program through controlling relevant hardware. An associated computer program may be stored in a computer readable memory medium (e.g., a non-transitory computer readable memory), for example, stored in the terminal's memory, and may be executed by at least one processor in the terminal. An execution process may include, for example, implementation of the above methods, wherein the memory medium may be a non-transitory computer readable medium, a disk, a CD, a ROM or a RAM.

With respect to the system for automatically switching a subscriber mode through identifying an IMSI, all function modules thereof may be integrated in a processing chip, or all function modules may have independent physical presence, or two or more modules may be integrated in a module. The above integrated module may either be embodied in the form of hardware, or may be embodied in the form of a software function module. If the integrated module is embodied in the form of a software function module, and sold or used as an independent product, the integrated module may also be stored in a computer readable memory medium, said memory medium being, for example, a non-transitory computer readable medium, a ROM, a disk or a CD.

With respect to the method and system for automatically switching a subscriber mode through identifying an IMSI, by setting an IMSI of a SIM card to correspond to a subscriber mode, and by performing two determination processes on a newly inserted SIM card, a cell phone can automatically enter different subscriber modes with no need to select manually when a subscriber inserts a different SIM card. Moreover, the two determination processes may ensure quick and efficient completion of a process to identify an IMSI, and may automatically switch a subscriber mode, which may improve an experience of a user with an associated cell phone.

It should be understood that applications of the present invention are not limited to the above examples. To those skilled in the art, improvements or modifications may be made according to the above description, and all of these improvements or modifications shall be encompassed by the appended claims.

The invention claimed is:

1. A method for automatically switching a subscriber mode through identifying an IMSI, the method comprising:
when a cell phone is turned on, reading a first IMSI of a first SIM card currently inserted into the cell phone;
determining if the first IMSI is consistent with a second IMSI pre-stored in a memory of the cell phone, wherein the memory of the cell phone is separate from the first SIM card, and wherein the second IMSI was pre-stored in response to a shut down of the cell phone;

if the first IMSI is determined to be consistent with the second IMSI, the cell phone enters a subscriber mode corresponding to the second IMSI;

if the first IMSI is determined to not be consistent with the second IMSI, the first IMSI is compared with a third IMSI in an IMSI list pre-stored in the cell phone; and when the first IMSI is determined to be consistent with the third IMSI, the cell phone enters a subscriber mode corresponding to the third IMSI.

2. The method according to claim 1, further comprising:

pre-setting an IMSI list in a cell phone, receiving an IMSI entered by a subscriber, and storing the IMSI entered by the subscriber into the IMSI list, receiving a subscriber mode configuration set by the subscriber for the IMSI entered by the subscriber, storing the subscriber mode configuration in the IMSI list and correlating to the IMSI entered by the subscriber, and wherein the cell phone pre-stores the second IMSI in response to a shut down of the cell phone, and the cell phone automatically records the second IMSI of a second SIM card and information of a subscriber mode associated with the second SIM card, and stores the second IMSI and the information of the subscriber mode associated with the second SIM card in the memory of the cell phone.

3. The method according to claim 2, further comprising, setting up a mode change menu in the cell phone for performing subscriber-defined setup on the IMSI list, and setting up login authority for the mode change menu;

receiving a control code entered by a subscriber and performing verification of the control code; and if the control code is verified, entering a settings interface of the mode change menu.

4. The method according to claim 3, further comprising, when the first IMSI is determined to not be consistent with any IMSI in the IMSI list pre-stored in the cell phone, the cell phone enters a control code input interface of the mode change menu, receiving a control code inputted by a subscriber and performing verification of the control code; and if the control code is verified, entering the settings interface of the mode change menu to add the first IMSI to the IMSI list, and receiving and storing the subscriber mode entered by the subscriber corresponding to the first IMSI.

5. The method according to claim 4, wherein the cell phone enters the subscriber mode entered by the subscriber, corresponding to the first IMSI, when the first IMSI is added to the IMSI list, and the subscriber mode set by the subscriber, corresponding to the first IMSI, is received and stored.

6. The method according to claim 3, wherein the cell phone enters a regular mode, that only has a function to make emergency calls, when the first IMSI is determined to not be consistent with any IMSI in the IMSI list pre-stored in the cell phone, and when the received control code, that is entered by the subscriber, fails verification.

7. The method according to claim 3, wherein control code verification information is stored in the mode change menu and data information of the mode change menu is stored in the memory of the cell phone.

8. The method according to claim 1, wherein, when the cell phone pre-stores the second IMSI, and in response to a shut down of the cell phone, the cell phone automatically records the second IMSI of a second SIM card and second IMSI information corresponding to the subscriber mode, and stores the second IMSI and the second IMSI information in the memory of the cell phone.

9. The method according to claim 1, further comprising, when the cell phone pre-stores the IMSI list, setting up an IMSI list in the cell phone, receiving an IMSI entered by a subscriber and storing the IMSI, entered by the subscriber, into the IMSI list, receiving a subscriber mode configuration set by the subscriber for the IMSI entered by the subscriber, storing the subscriber mode configuration, set by the subscriber, in the IMSI list and correlating the subscriber mode configuration, set by the subscriber, to the IMSI entered by the subscriber.

10. The method according to claim 9, further comprising:

setting up a mode change menu in the cell phone for performing subscriber-defined setup on the IMSI list, and setting up login authority for the mode change menu;

receiving a control code entered by a subscriber and performing verification of the control code; and if the control code is verified, entering a settings interface of the mode change menu.

11. The method according to claim 10, further comprising:

when the first IMSI is determined to not be consistent with any IMSI in the IMSI list pre-stored in the cell phone, the cell phone enters a control code input interface of the mode change menu, receiving a control code inputted by a subscriber and performing verification of the control code; and if the control code is verified, entering the settings interface of the mode change menu to add the first IMSI to the IMSI list, and receiving and storing the subscriber mode entered by the subscriber corresponding to the first IMSI.

12. The method according to claim 11, wherein the cell phone enters the subscriber mode entered by the subscriber, corresponding to the first IMSI, when the first IMSI is added to the IMSI list, and the subscriber mode set by the subscriber, corresponding to the first IMSI, is received and stored.

13. The method according to claim 11, wherein the cell phone enters a regular mode, that only has a function to make emergency calls, when the first IMSI is determined to not be consistent with any IMSI in the IMSI list pre-stored in the cell phone, and when the received control code, that is entered by the subscriber, fails verification.

14. The method according to claim 10, wherein control code verification information is stored in the mode change menu and data information of the mode change menu is stored in the memory of the cell phone.

15. A system for automatically switching a subscriber mode through identifying an IMSI, the system comprising:

a first IMSI reading module for reading a first IMSI of a first SIM card currently inserted into the cell phone;

a second IMSI matching determination module for determining if the first IMSI is consistent with a second IMSI pre-stored in a memory of the cell phone, wherein the memory of the cell phone is separate from the first SIM card, and carrying out predetermined operations according to a result of the determining; and an IMSI list matching determination module for matching the first IMSI with a third IMSI in an IMSI list pre-stored in the memory of the cell phone, and when the first IMSI is determined to be consistent with the third IMSI, the cell phone enters a subscriber mode corresponding to the third IMSI.

16. A non-transitory storage medium, which stores processor executable commands therein that, when executed by a processor, cause the processor to:

when a cell phone is turned on, read a first IMSI of a first SIM card currently inserted into the cell phone;

determine if the first IMSI is consistent with a second IMSI pre-stored in the cell phone, wherein the second IMSI of a second SIM card and second IMSI information corresponding to a subscriber mode were stored in a memory of the cell phone automatically in response to a shut down of the cell phone, wherein the memory of the cell phone is separate from the first SIM card;

if the first IMSI is determined to be consistent with the second IMSI, the cell phone enters the subscriber mode corresponding to the second IMSI;

if the first IMSI is determined to not be consistent with the second IMSI, the first IMSI is compared with a third IMSI in an IMSI list pre-stored in the cell phone; and when the first IMSI is determined to be consistent with the third IMSI, the cell phone enters a subscriber mode corresponding to the third IMSI.

17. The system of claim 15, wherein the IMSI list matching determination module executes the matching in response to the result of the determining being inconsistent.

18. The storage medium according to claim 16, further comprising, when the cell phone pre-stores the IMSI list, setting up an IMSI list in the cell phone, receiving an IMSI entered by a subscriber and storing the IMSI, entered by the subscriber, into the IMSI list, receiving a subscriber mode configuration set by the subscriber for the IMSI entered by the subscriber, storing the subscriber mode configuration, set by the subscriber, in the IMSI list and correlating the subscriber mode configuration, set by the subscriber, to the IMSI entered by the subscriber.

19. The storage medium according to claim 18, further comprising:

setting up a mode change menu in the cell phone for performing subscriber-defined setup on the IMSI list, and setting up login authority for the mode change menu;

receiving a control code entered by a subscriber and performing verification of the control code; and if the control code is verified, entering a settings interface of the mode change menu.

20. The storage medium according to claim 19, further comprising:

when the first IMSI is determined to not be consistent with any IMSI in the IMSI list pre-stored in the cell phone, the cell phone enters a control code input interface of the mode change menu, receiving a control code inputted by a subscriber and performing verification of the control code; and if the control code is verified, entering the settings interface of the mode change menu to add the first IMSI to the IMSI list, and receiving and storing the subscriber mode entered by the subscriber corresponding to the first IMSI.

* * * * *